June 25, 1963    J. F. KINNEY    3,094,839
BELLOWS ARRANGEMENT PROVIDING FAILURE PROTECTION
Filed Sept. 29, 1958
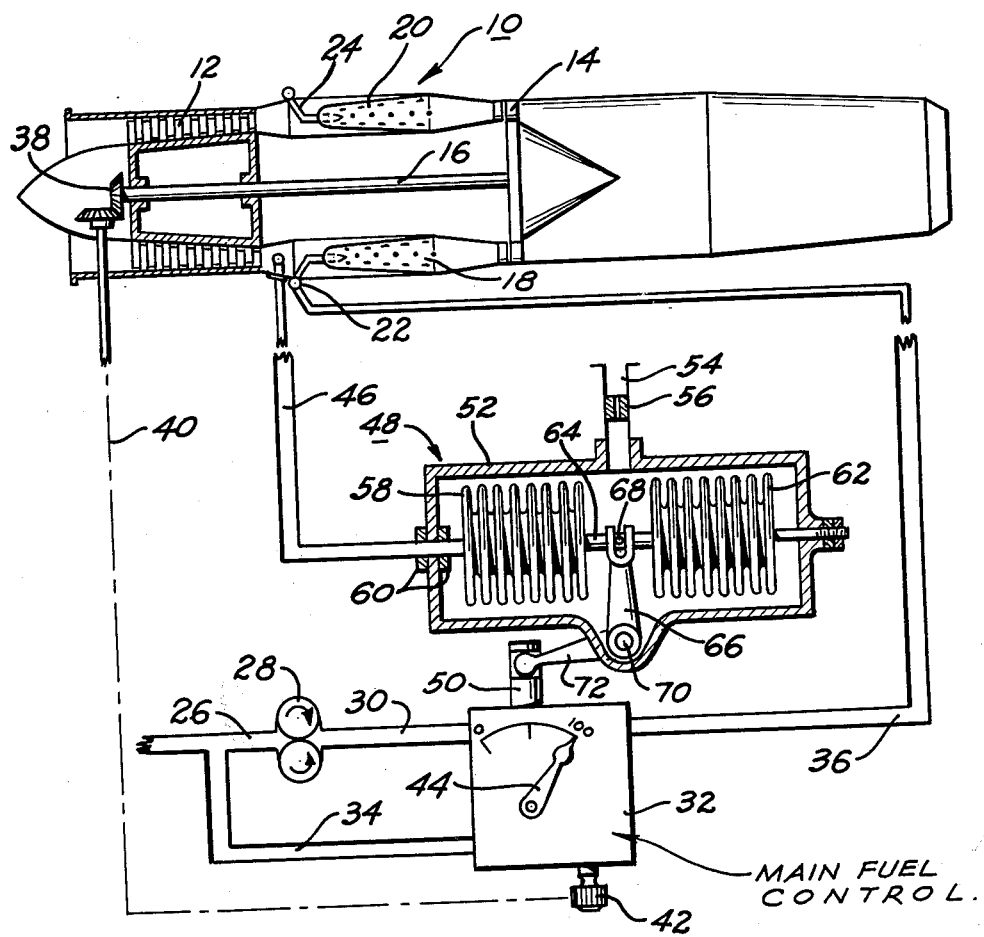
INVENTOR.
JOHN F. KINNEY.
BY Cecil J Arens
ATTORNEY.

United States Patent Office

3,094,839
Patented June 25, 1963

3,094,839
BELLOWS ARRANGEMENT PROVIDING FAILURE PROTECTION
John F. Kinney, South Bend, Ind., assignor to The Bendix Corporation, a corporation of Delaware
Filed Sept. 29, 1958, Ser. No. 764,168
7 Claims. (Cl. 60—39.09)

The present invention relates to a bellows arrangement, and more particularly to a bellows arrangement for use with engine fuel control apparatus having means for preventing adverse effects to an engine upon bellows failure.

It is a common practice in fuel control apparatus to utilize a bellows arrangement responsive to an external or engine generated air pressure for actuating a metering valve or similar means which in turns aids in controlling the rate of fuel supply to the engine. By way of example, copending application Serial No. 499,432 filed April 5, 1955 assigned to same assignee as is the present application, shows a bellows arrangement responsive to a pressure generated by a compressor of a gas turbine engine for controlling a metering valve in response thereto. Such arrangements are accomplished by the inherent disadvantage that if the bellows fails as by rupturing or acquiring perforations, the pressure differential across the bellows is nullified causing large fuel flow departures from that requested. This can be especially serious when the bellows is being used in an aircraft installation where full power during take-off conditions and other maneuvers is critical.

Accordingly, it is an object of the present invention to provide an improved bellows arrangement for use with fuel control apparatus for an engine.

It is another object to provide a bellows arrangement which retains an operating pressure differential on bellows failure.

It is another object to provide a bellows arrangement having means to prevent the loss of an operating pressure differential should a bellows rupture or develop a significant leak.

It is another object to provide a bellows arrangement having a plurality of bellows, one of which is a primary controlling bellows, and means to shift control to another bellows should the primary controlling bellows fail.

Other objects and advantages will become apparent from the following description and accompanying drawing wherein a schematic view of an engine and apparatus for controlling the engine is shown including the novel bellows arrangement of the present invention.

In the drawing, a gas turbine engine as generally designated by numeral 10 includes a compressor 12, a turbine 14, and a drive shaft 16 connected between said compressor and said turbine. A plurality of combustion chambers 18 are provided and are supplied fuel from a common fuel manifold 22 through individual fuel lines 24 and nozzles 20.

Associated with engine 10 is control apparatus for supplying fuel to manifold 22 including a main fuel supply conduit 26, a high pressure supply pump 28 of the positive displacement type, a pump outlet conduit 30, a main fuel control 32 which may be of the type shown in previously referred to copending application 499,432. A return conduit 34 is provided for returning excess fuel from main control 32 to supply conduit 26. Another fuel conduit 36 is connected between main fuel control 32 and the manifold 22 of the engine 10 for supplying metered fuel to said engine. The fuel flow controlling function of main control 32 may be scheduled in accordance with the following parameters: the operating speed of compressor 12 as transmitted through bevel gears 38, any well known mechanical connection represented by dashed line 40, and splined shaft 42; the position of a manually controllable lever 44; and a compressor generated air pressure as transmitted from engine 10 by conduit 46, pressure responsive bellows assembly 48, and the axially slidable shaft 50 of the main control 32.

Bellows assembly 48 is operative to axially position shaft 50 as a function of the variations of a compressor generated generated air pressure transmitted by conduit 46 and is comprised of an exterior housing 52 vented to the atmosphere through conduit 54 containing fixed restrictive bleed member 56; a first bellows 58 within housing 52 fixedly secured on one end to housing 52 by jam nuts 60; a second bellows 62 evacuated and sealed and secured on one end to housing 52; a connecting rod 64 joining the movable ends of said first and second bellows; and, a pivotable lever 66 having a pinned connection 68 with connecting rod 64. The mounting shaft 70 for lever 66 is rotationally movable with said lever and extends externally through housing 52 where it is rigidly attached to lever 72 which is in operative engagement with axially movable shaft 50.

OPERATION

Atmospheric pressure is transmitted through restriction 56 into the interior of housing 52 wherein it surrounds bellows 58 and 62, which are matched in size and effective surface area, producing equal and oppositely acting force components tending to move rod 64. The compressor generated pressure contained in conduit 46 is induced into the interior of bellows 58 tending to expand it and position the movable end thereof to the right. Inasmuch as bellows 62 is evacuated and sealed the interior pressure closely approaches absolute zero. Thus the resultant force tending to position connecting rod 64 is a function of the difference between the compressor generated pressure in bellows 58 and absolute zero pressure in bellows 62. The movement of the connecting rod 64 is in turn transmitted through levers 66 and 72 to position axial shaft 50.

*Failure of Bellows 62*

Assume bellows 62 should fail as by rupturing or incurring a significant leak. Atmospheric pressure in housing 52 would enter the previously sealed bellows raising the pressure therein by one atmosphere. Further assuming the pressure within bellows 58 to be in the range of 10 atmospheres, the resultant system error due to failure of bellows 62 would be approximately 10%. This is to be contrasted with a single bellows system wherein bellows failure would equalize the pressure on both sides of the bellows causing a 100% error.

*Failure of Bellows 58*

Assuming bellows 58 should fail, the air would escape into the interior of housing 52. Further escape of air from housing 52 into the atmosphere is restricted by operation of restrictive bleed member 56 which would permit a pressure build-up within the housing. The relative size of bleed 56 and conduit 46 may be so designed that the supply of air to housing 52 may be considered infinite with respect to the small amount escaping therefrom, thus allowing the pressure in the housing to closely approach that which was contained in bellows 58 prior to failure. The pressure on either side of bellows 58 would tend to equalize after failure thus nullifying the connecting rod controlling function of said bellows. The high pressure within housing 52 would then be impressed upon bellows 62 which would be operative as a single bellows to control the position of rod 64. If before failure the pressure in bellows 58 is ten atmospheres and the restriction 56 is relatively small with respect to the size of orifice 46 the pressure within housing 52 after failure will closely approximate ten atmospheres of pressure thus resulting in negligible system failure.

Although the present invention has been described with a certain degree of particularity, it should be understood that the present disclosure has been made by way of example and that numerous changes in the details and arrangement of parts may be resorted to without departing from the scope or spirit of the present invention.

I claim:

1. Pressure sensing apparatus comprising: a housing; a first conduit having a restrictive bleed therein connected to said housing for venting the interior thereof to the atmosphere; a first and second equal size bellows contained in said housing and rigidly secured to opposite ends thereof; said second bellows evacuated and sealed; a connecting rod connected to a movable end of said first and second bellows respectively; a second conduit connected to said first bellows and operative to transmit a sensed pressure into the interior thereof; output lever means connected to said connecting rod and movably positionable therewith.

2. Pressure sensing apparatus comprising: a housing; a conduit having a restrictive bleed therein connected to said housing for venting the interior thereof to the atmosphere; first and second equal size bellows secured on one end each to the interior of said housing; said bellows each having a movable end in opposing spaced relationship with each other; said first bellows communicating interiorly with a sensed pressure; said second bellows evacuated and sealed; output means connected to the movable ends of said first and said second bellows so as to be positionable as a function of the combined movement of said bellows.

3. Pressure sensing apparatus comprising: a housing having a fixed restrictive opening therein; a primary bellows communicating interiorly with a sensed pressure; a second evacuated bellows having an effective surface area substantially equal to that of said primary bellows; said primary and secondary bellows contained in said housing in spaced relationship with respect to each other; ouput means connected to the movable ends of said primary and said secondary bellows so as to be positionable as a function of the combined movement of said bellows.

4. Pressure sensing apparatus comprising: a first and second bellows each having a fixed and a movable end and substantially equal effective surface area; said bellows located in opposing spaced relationship with respect to each other; means for communicating a sensed air pressure to the interior of said first bellows; means enveloping said bellows and operative to retain said sensed pressure in the event said first bellows should fail; means operative to communicate atmospheric pressure into the interior of said last named means when said first bellows has not failed.

5. Pressure sensing apparatus comprising: sensing means susceptible to failure exposed to a pressure to be sensed; output means connected to said sensing means and positionable as a function of said sensed pressure; reference means operative with said sensing means to provide a substantially absolute zero reference air pressure; means operative with said sensing means and said reference means to transmit said pressure to be sensed from said sensing means to said reference means on failure of said sensing means; said reference means connected to said output means and being so constructed and arranged that the functional relationship of the position of the output means to said sensed pressure remains substantially constant.

6. Pressure sensing apparatus comprising: a first bellows interiorly exposed to the pressure to be sensed; output means connected to said first bellows and movable in a first and a second direction; said first bellows being operative to move said output means in said first direction when the pressure to be sensed is increasing and being operative to move said output means in said second direction when the pressure to be sensed is decreasing; a second bellows having an effective surface area substantially equal to that of said first bellows and being connected to said output means; means operative on failure of said first bellows to communicate said sensed pressure to said second bellows; said second bellows arranged with respect to said output means to move said output means in said first direction with increasing sensed pressure and in said second direction with decreasing sensed pressure when said first bellows has failed.

7. In a fuel supply and control system for an engine having a combustion section; the combination of a conduit for supplying fuel to said engine; fuel control apparatus responsive to a position input and operative with said conduit for controlling the rate of fuel flow therethrough as a function of said position input; lever means connected to said fuel control and operative to provide the position input therefor; a first bellows having a movable end connected to said lever means; a second evacuated bellows having a movable end connected to said lever means; said first and second bellows having substantially equal effective areas; means connected to said engine and said first bellows operative to transmit an operating pressure of said engine to said first bellows; and a housing enveloping said first and second bellows having a fixed restrictive opening therein communicating the interior of said housing with atmospheric air when no air leakage through said first bellows exists; said fixed restrictive opening further operative to substantially retain said operating pressure within said housing when leakage through said first bellows does exist.

References Cited in the file of this patent

UNITED STATES PATENTS

| | | |
|---|---|---|
| 1,631,262 | Gourdou | June 7, 1927 |
| 2,642,718 | Pearl | June 23, 1939 |
| 2,657,530 | Lee | Nov. 3, 1953 |
| 2,668,414 | Lee | Feb. 9, 1954 |
| 2,674,268 | Kimm | Apr. 6, 1954 |
| 2,780,054 | Coar et al. | Feb. 5, 1957 |
| 2,796,733 | Pearl et al. | June 25, 1957 |
| 2,966,140 | Dungan | Dec. 27, 1960 |